(12) United States Patent
Miller et al.

(10) Patent No.: US 10,916,993 B2
(45) Date of Patent: Feb. 9, 2021

(54) METHOD FOR HEAT TRANSFER ACROSS ROTARY JOINT

(71) Applicant: Raytheon Company, Waltham, MA (US)

(72) Inventors: Kirk A. Miller, Dallas, TX (US); Brian M. Graue, Melissa, TX (US); William T. Bogert, Plano, TX (US)

(73) Assignee: Raytheon Company, Waltham, MA (US)

( * ) Notice: Subject to any disclaimer, the term of this patent is extended or adjusted under 35 U.S.C. 154(b) by 209 days.

(21) Appl. No.: 16/009,073

(22) Filed: Jun. 14, 2018

(65) Prior Publication Data

US 2019/0386543 A1    Dec. 19, 2019

(51) Int. Cl.
*H02K 9/22* (2006.01)
*H02K 26/00* (2006.01)

(52) U.S. Cl.
CPC .............. *H02K 9/22* (2013.01); *H02K 26/00* (2013.01)

(58) Field of Classification Search
CPC ................................. H02K 9/22; H02K 26/00
See application file for complete search history.

(56) References Cited

U.S. PATENT DOCUMENTS

| | | | |
|---|---|---|---|
| 4,048,530 A * | 9/1977 | Kaufman, Jr. ........... | H02K 5/04 310/89 |
| 4,577,127 A * | 3/1986 | Ferree .................... | B25J 9/1025 310/112 |
| 5,550,413 A * | 8/1996 | Bernus ................ | F16C 32/0444 310/36 |
| 5,625,240 A * | 4/1997 | Bernus ................ | F16C 32/0444 310/90.5 |
| 6,034,462 A * | 3/2000 | Woodward, Jr. ......... | H02K 1/06 310/104 |
| 6,066,908 A * | 5/2000 | Woodward, Jr. ......... | H02K 1/06 310/216.045 |
| 6,727,609 B2 | 4/2004 | Johnsen | |
| 6,982,506 B1 | 1/2006 | Johnsen | |

(Continued)

FOREIGN PATENT DOCUMENTS

| | | |
|---|---|---|
| DE | 102014203944 A1 | 9/2015 |
| EP | 3192693 A1 | 7/2017 |

(Continued)

OTHER PUBLICATIONS

International Search Report and Written Opinion of the International Searching Authority in connection with PCT Patent Application No. PCT/US2019/015131 dated May 7, 2019, 11 pages.

*Primary Examiner* — Emily P Pham

(57) ABSTRACT

A torque motor includes a large area rotor, a stator surrounding at least a portion of the rotor, and a small air gap separating the rotor from the stator to allow frictionless thermal coupling between the rotor and the stator. Heat from the rotor is transferred to the stator by conduction. The stator contacts an inner surface for a housing of the torque motor for conductively coupling to a cold environment air flow exterior to the torque motor housing. The air gap may have a dimension of about 0.002 to 0.003 inches. The stator may be conductively coupled to the torque motor housing by one of a thermal gap pad or high conductivity thermal gap filling compound. Heat conduction from the rotor to the stator preferably occurs without rotation of the rotor.

20 Claims, 8 Drawing Sheets

(56) References Cited

U.S. PATENT DOCUMENTS

| | | | |
|---|---|---|---|
| 8,390,157 B2* | 3/2013 | Watanabe | H02K 3/522 310/64 |
| 8,466,649 B2* | 6/2013 | Hyde | H02K 9/19 318/473 |
| 2004/0036367 A1 | 2/2004 | Denton et al. | |
| 2006/0186749 A1* | 8/2006 | Strydom | H02K 53/00 310/103 |
| 2018/0109061 A1* | 4/2018 | Pardhan | H02K 9/22 |

FOREIGN PATENT DOCUMENTS

| | | |
|---|---|---|
| EP | 3261237 A1 | 12/2017 |
| WO | 2017/024409 A1 | 2/2017 |

\* cited by examiner

METHOD FOR HEAT TRANSFER ACROSS ROTARY JOINT

GOVERNMENT RIGHTS

This invention was made with U.S. government support under a confidential government contract (contract number withheld) awarded by the U.S. government. The U.S. government has certain rights in the invention.

TECHNICAL FIELD

The present disclosure is directed in general to conductive heat transfer in torque motors and, more particularly, to improve an air-gap conductive heat transfer path within such motors.

BACKGROUND OF THE DISCLOSURE

Within brushed torque motors, the rotor may overheat due to aerodynamic torque loading. In some designs, the conductive heat transfer path is insufficient due, for example, to presence of gear reduction mechanism.

SUMMARY OF THE DISCLOSURE

In one embodiment of the present disclosure, a torque motor includes a large area rotor, a stator surrounding at least a portion of the rotor, and a small air gap separating the rotor from the stator to allow frictionless thermal coupling between the rotor and the stator. Heat from the rotor is transferred to the stator by conduction. The stator contacts an inner surface of the housing of the torque motor for conductively coupling to a cold environment air flow exterior to the torque motor housing. The air gap may have a dimension of about 0.002 to 0.003 inches. The stator may be conductively coupled to the torque motor housing by one of a thermal gap pad or high conductivity thermal gap filling compound. Heat conduction from the rotor to the stator occurs with or without rotation of the rotor. In one analytical example of a use case where a specific torquer is integrated on a specific system, the torque motor can provide approximately 60 foot-pounds (ft·lb) of torque at an outside air temperature (OAT) of approximately 17° C., dissipating about 450 Watts (W) of power. Shimming at an interface between the stator and an internal support structure for the stator may be employed to adjust a dimension of the air gap. An outermost surface area of the rotor is preferably made as large as possible within spatial dimensions of the housing and other components required for the torque motor.

In another embodiment of the present disclosure, a method of forming a torque motor includes providing a large area rotor, providing a stator surrounding at least a portion of the rotor, and providing a small air gap separating the rotor from the stator and allowing frictionless thermal coupling between the rotor and the stator. Heat from the rotor is transferred to the stator by conduction. The stator contacts an inner surface of the housing of the torque motor for conductively coupling to a cold environment air flow exterior to the torque motor housing. The air gap may have a dimension of about 0.002 to 0.003 inches. The stator may be conductively coupled to the torque motor housing by one of a thermal gap pad or high conductivity thermal gap filling compound. Heat conduction from the rotor to the stator with or without rotation of the rotor. In one analytical example of a use case where a specific torquer is integrated on a specific system, the torque motor can provide approximately 60 foot-pounds (ft·lb) of torque at an outside air temperature (OAT) of approximately 17° C., dissipating about 450 Watts (W) of power. Shimming at an interface between the stator and an internal support structure for the stator may be employed to adjust a dimension of the air gap. An outermost surface area of the rotor is preferably made as large as possible within spatial dimensions of the housing and other components required for the torque motor.

In still another embodiment of the present disclosure, a method of retrofitting a torque motor includes providing a rotor having an outermost surface area that is as large as possible within spatial dimensions of an existing housing for the torque motor and other components required within the existing housing for the torque motor, providing a stator surrounding at least a portion of the rotor, and providing a small air gap separating the rotor from the stator and allowing frictionless thermal coupling between the rotor and the stator. Heat from the rotor is transferred to the stator by conduction. The stator contacts an inner surface of the housing of the torque motor for conductively coupling to a cold environment air flow exterior to the torque motor housing. The air gap may have a dimension of about 0.002 to 0.003 inches. The stator may be conductively coupled to the torque motor housing by one of a thermal gap pad or high conductivity thermal gap filling compound. Heat conduction from the rotor to the stator with or without rotation of the rotor. In one analytical example of a use case where a specific torquer is integrated on a specific system, the torque motor can provide approximately 60 foot-pounds (ft·lb) of torque at an outside air temperature (OAT) of approximately 17° C., dissipating about 450 Watts (W) of power. Shimming at an interface between the stator and an internal support structure for the stator may be employed to adjust a dimension of the air gap.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
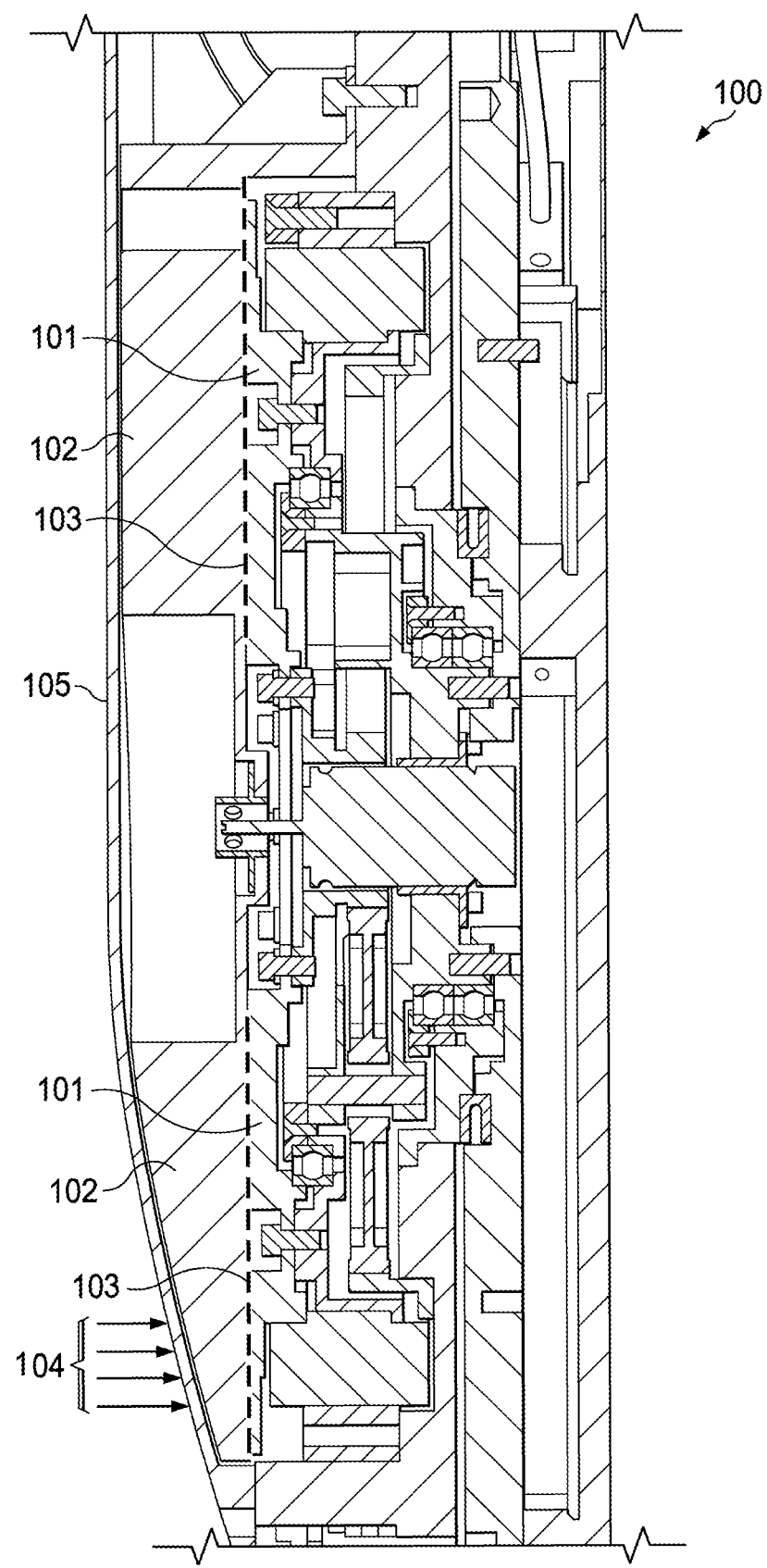
FIG. 1 is a partial sectional diagram of a torque motor with improved heat transfer across a rotary joint in accordance with embodiments of the present disclosure.

It should be understood at the outset that, although embodiments are illustrated in the figures and described below, the principles of the present disclosure may be implemented using any number of techniques, whether currently known or not. The present disclosure should in no way be limited to the implementations and techniques illustrated in the drawings and described below. Additionally, unless otherwise specifically noted, articles depicted in the drawings are not necessarily drawn to scale.

Airborne, multi-axis, turreted systems require electric motors to overcome aerodynamic loading in order to steer the system into position. Typically this involves three motors, each along a different axis. The performance of the motors is thermally limited (subject to overheating), which nulls system operation at higher aircraft speeds and aerodynamic loads. When brushed torque motors are employed, performance may be limited by the rotor overheating due to aerodynamic torque loading. The overheating may occur because the conductive heat path is insufficient due to any one of a variety of factors.

One approach considered for improving the conduction heat path is direct drive torque (e.g., brushless) motors employing conductive coupling. Other options include forced air convection using a fan or a blower and ductwork similar to the description within U.S. Patent Application Publication No. 2004/036367, or running liquid coolant through the rotor as described in U.S. Pat. Nos. 6,727,609 and 6,982,506. However, in order to retrofit existing motor architectures, both the forced air path and liquid coolant options are neither viable nor cost-effective, in particular since both also require an auxiliary pump.

In the present disclosure, heat is conducted over a thin air gap from the rotor to an external heat sink without requiring a custom rotor through which coolant or air can be forced. Instead, the motor is designed for conduction rather than convection, because conduction is less affected by air density than forced convection and does not require a fan. A pair of large area disks that are separated by a small gap allow frictionless thermal coupling of the rotor to the stator. The stator, in turn, is conductively coupled to the exterior of turret using a thermal gap pad or high conductivity thermal gap filling compound. In particular, because decreases in air density (e.g., with elevation) reduce the effectiveness of conduction through an air gap, large disks are used provide as much area for the conductive heat transfer path as possible.

FIG. 1 is a partial sectional diagram of a torque motor 100 with improved heat transfer across a rotary joint in accordance with embodiments of the present disclosure. For simplicity and clarity, only a partial section of the torque motor 100 is shown, although those skilled in the art will recognize that the complete rotor, stator and housing form generally annular structures having a cross-section and spacing depicted around the circumference of the respective structure. Torque motor 100, which in the embodiment depicted is a brushed torque motor, includes a rotor 101 and stator 102 separated by an air gap 103 (indicated by a dashed line in FIG. 1). The rotor 101 is formed of one or more large metal disks with, preferably, as much external surface area at the outermost diameter(s) as possible. In one embodiment, rotor 101 has 44.8 square inches (sq. in.) of external surface area. Since the relevant surface area is defined by the length (along an axial direction) and outer diameter circumference(s) of the rotor, increasing either or both of the circumference(s) and the length will increase the area. As a practical matter, however, increases in the circumference(s) may be constrained, such that increased area will be most practically be achieved by increasing the rotor length. In some embodiments, the rotor 101 may be implemented as a pair of large area disks. As used herein, "large area" refers to a rotor outermost surface area that is at least several orders of magnitude (e.g., from 100× to 1,000,000× or more) greater than the square of the length of the gap between the rotor 101 and the stator 102, and may be twice or more times the outermost surface area of a rotor in a torque motor design optimized for compactness and/or weight.

The stator 102 has an "external" surface area at the innermost diameter(s) (i.e., inside the annulus formed by the stator 102) that is comparable to the above-described external surface area of the rotor 101, and is typically larger due to the larger inner diameter(s) and optional larger length. The rotor 101 and stator 102 are separated by a small air gap 103 allowing a frictionless thermal coupling therebetween. As used herein, "small gap" and/or "small air gap" refer to a separation on the order of 0.01 inches or less, and more preferably between 0.002 and 0.003 inches. The metallic parts of the rotor 101 and stator 102 are preferably shimmed to be spaced as close as possible (thin air gap) while allowing free rotation. The volume of air between the outer surface of the rotor 101 and the nearest inner surface of the stator 102 forms the thermal conduction path. The large (or increased) area of the surfaces of rotor 101 and stator 102 defining that volume creates a large (longer and/or wider) thermal conduction path. Because heat transfer is less efficient over a longer air path, the small gap 103 (shorter length air path) separating the rotor 101 and stator 102 allows superior heat conduction efficiency while permitting free movement.

The stator 102 is conductively coupled to a motor housing 105, and thus to a cold environment air flow 104 exterior to the motor housing 105, by a thermal gap pad or high conductivity thermal gap filling compound. Heat conduction occurs even when the rotor 101 is not rotating, which allow the heat transfer can be used solely to counter aerodynamic loads on the system with no turret motion. Accordingly, higher aerodynamic loads at faster aircraft speeds are counteracted by improved convection out to and over the exterior of the system.

In contrast to the forced air path and liquid coolant options, the approach described in the present disclosure enables quick and simple retrofitting of existing systems. Two examples are provided in the illustrations of FIGS. 2B and 3B.

Figure 2A:
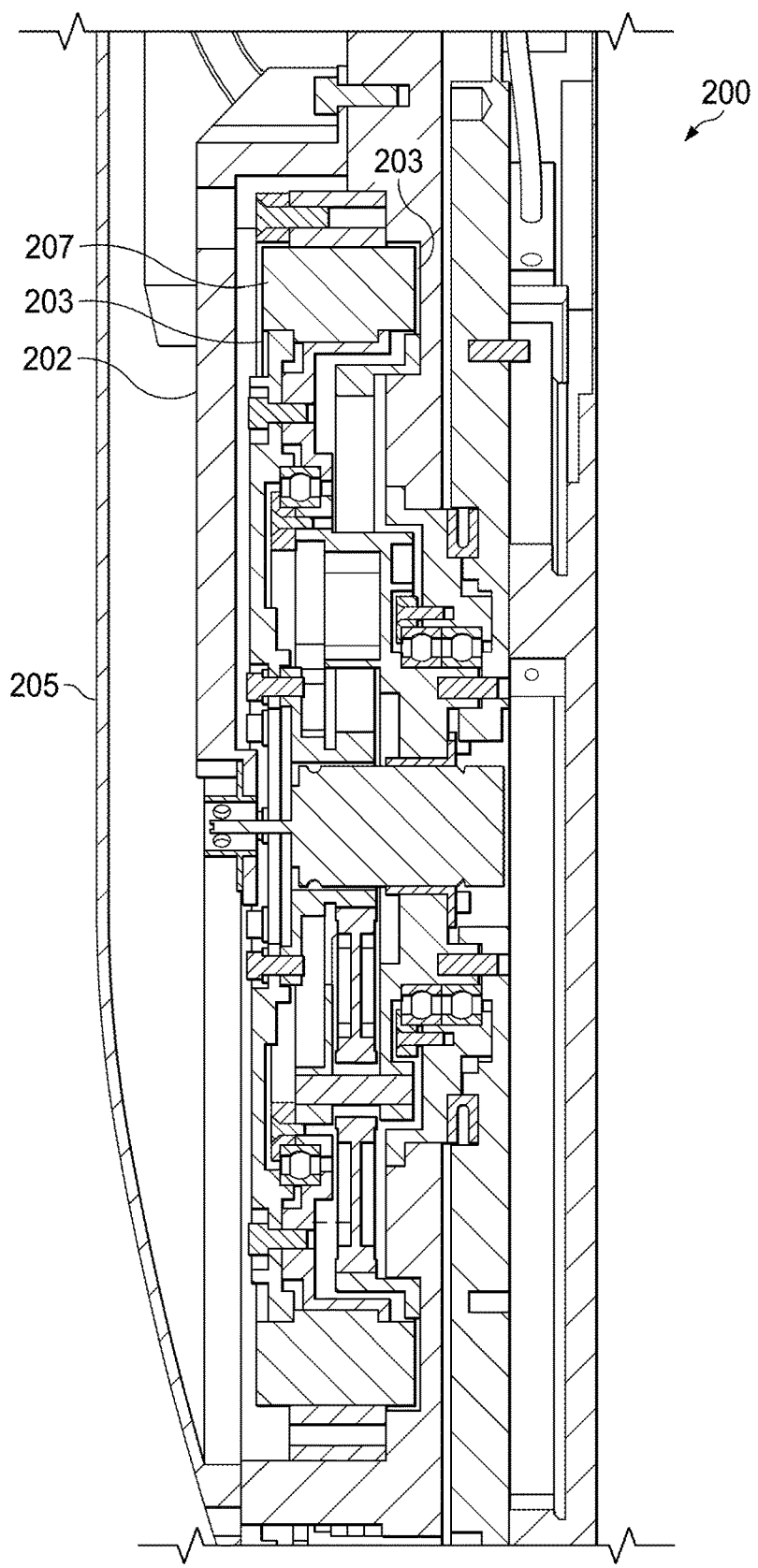
FIGS. 2A and 2B are comparative partial sectional diagrams of torque motors, respectively for an alternate or baseline design and for a design with close disks improving heat transfer across a rotary joint in accordance with one embodiment of the present disclosure.
Figure 2B:
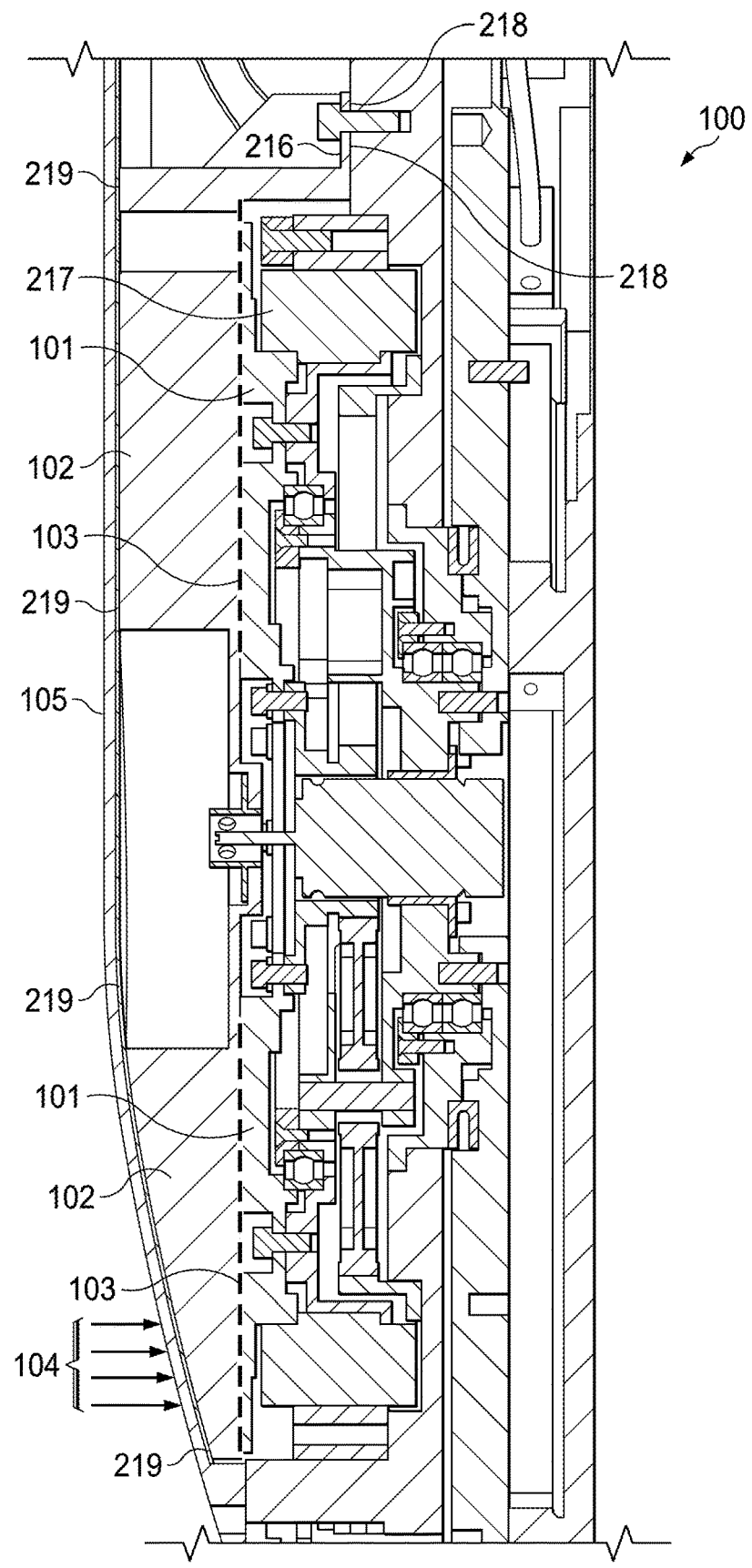

FIGS. 2A and 2B are comparative partial sectional diagrams of torque motors, respectively for an alternate or baseline design and for a design with close disks improving heat transfer across a rotary joint in accordance with one embodiment of the present disclosure. FIG. 2A is a prior art design. FIG. 2B is the embodiment of FIG. 1, reproduced for convenience of comparison with FIG. 2A. The alternate torque motor design 200 of FIG. 2A contains, as does each torque motor design described herein, a torquer including a series of magnets and an armature. In fact, the same torquer design may be used in each of the torque motor designs of FIGS. 2A-2B and 3A-3B. In FIG. 2A, the heat transfer occurs predominantly within the torquer 207 across an air gap 203 between the magnets and armature that has, nominally for the design depicted, dimensions of 0.010 inches with a surface area of 14.2 sq. in. By contrast, heat transfer within the design of FIG. 2B occurs predominantly between the rotor 101 and stator 102 rather than within torquer 217, and the rotor 101 and stator 102 in FIG. 2B provide a much larger (≥3×) heat transfer area than that within torquer 207 of FIG. 2A or torquer 217 of FIG. 2B. The air gap 103 between the rotor 101 and stator 102 is on the order of 0.002 to 0.003 inches, which may require shimming 218 that is preferably provided at the interface 216 for the stator 102. In addition, the stator 102 is wider (by 8×), extending all the way to the internal surface 219 of the torque motor housing 105, without the gap 203 between stator 202 and housing 205. A thermally conductive gap filling material is used between outer cover for housing 105 and the resolver mount for stator 102, to facilitate heat transfer to the external environment cold temperature airflow 104.

Figure 3A:
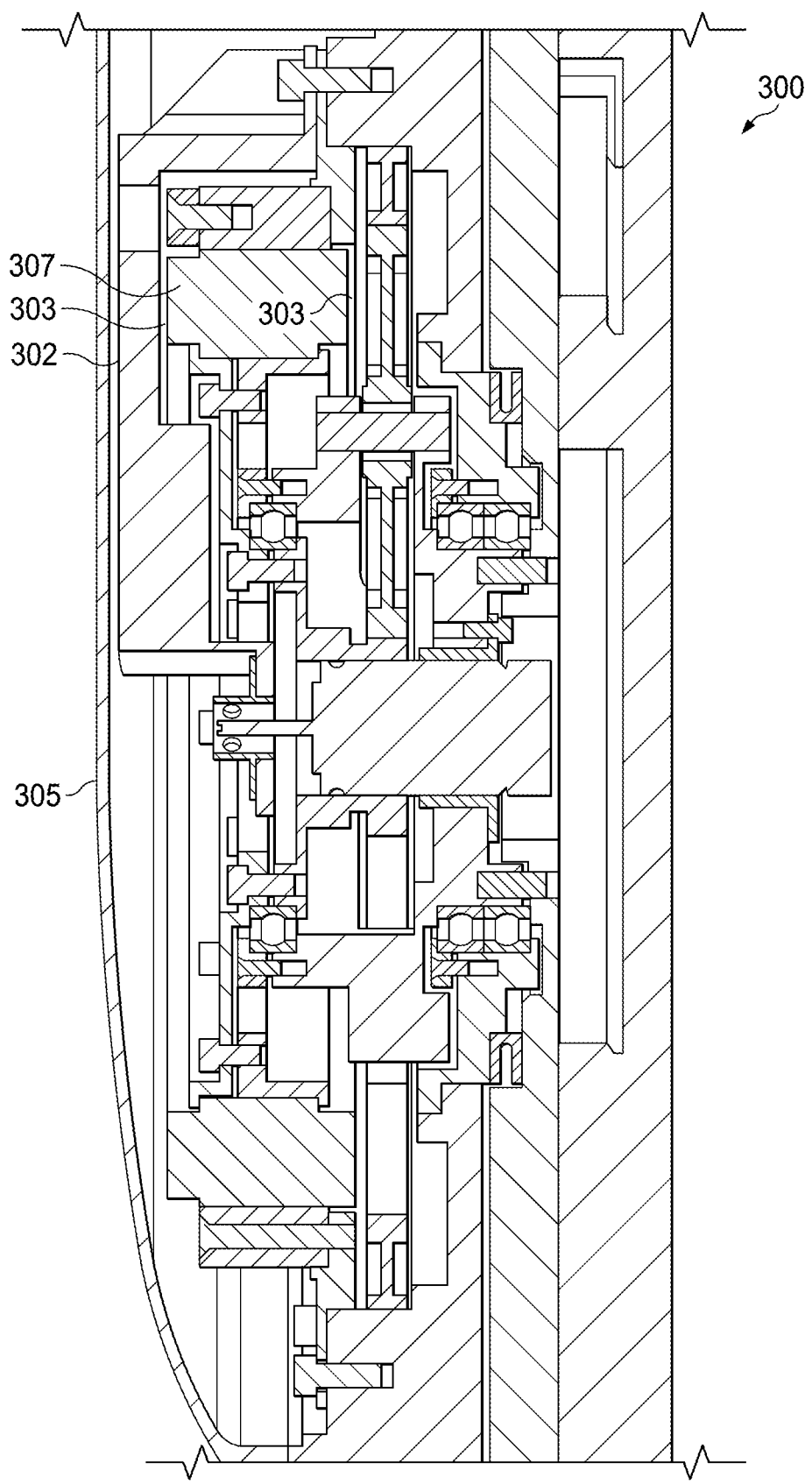
FIGS. 3A and 3B are comparative partial sectional diagrams of torque motors, respectively for an alternate or baseline design and for a design with close disks improving heat transfer across a rotary joint in accordance with another embodiment of the present disclosure.
Figure 3B:
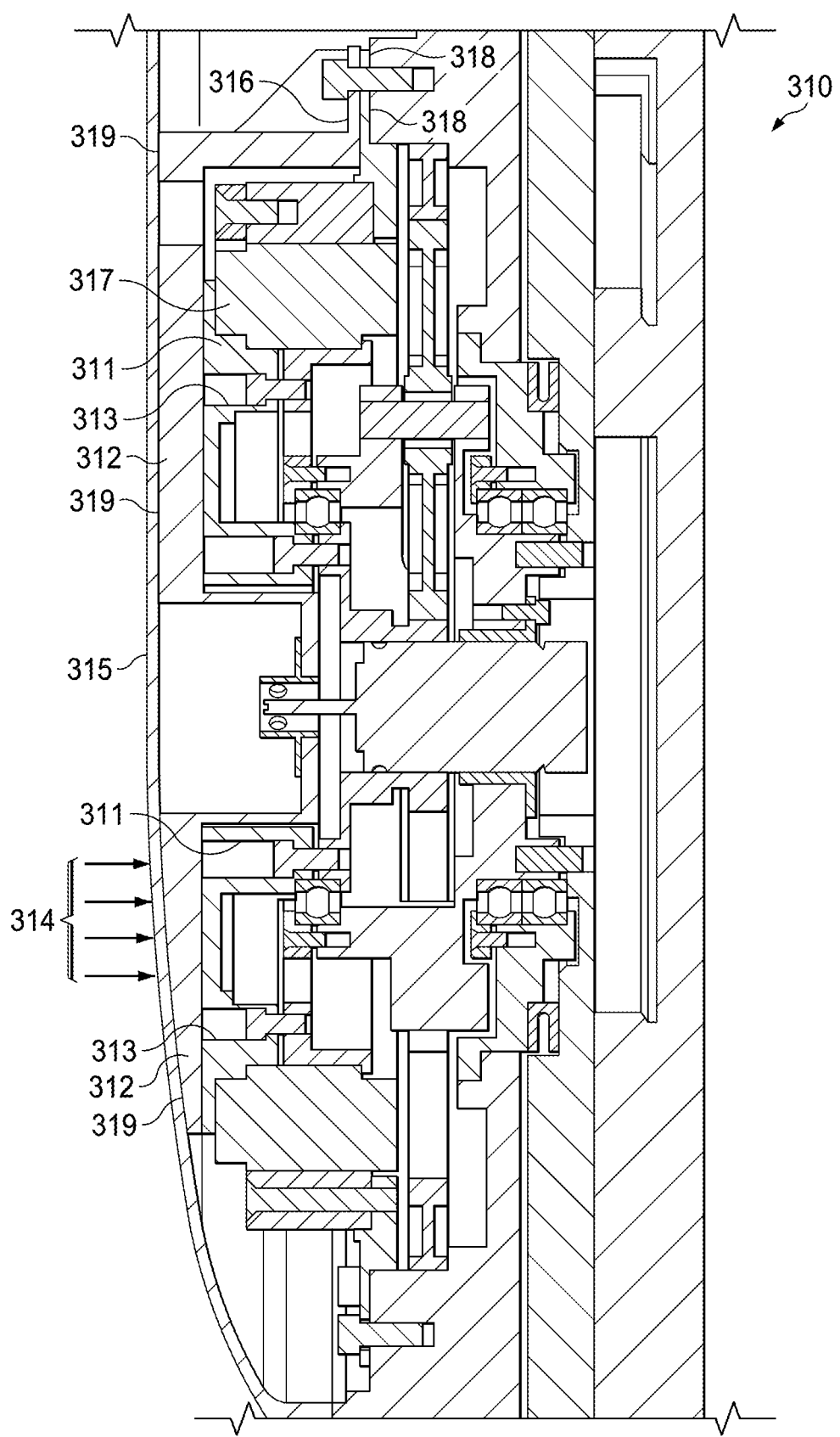

FIGS. 3A and 3B are comparative partial sectional diagrams of torque motors, respectively for an alternate or baseline design and for a design with close disks improving heat transfer across a rotary joint in accordance with another embodiment of the present disclosure. Once again, in the alternate torque motor design 300 of FIG. 3A, heat transfer occurs predominantly within the torquer 307 across the area air gap 303 between the magnets and armature. By contrast, the rotor 311 of the torque motor design 310 of FIG. 3B has a much larger (≥3×) heat transfer area than that within torquer 307 of FIG. 3A. The air gap 313 between the rotor 311 and stator 312 is on the order of 0.002 to 0.003 inches, which may require shimming 318 that is preferably provided at the interface 316 between the stator 312 and an internal support structure for the stator 312. In addition, the stator 312 is wider (e.g., about 29% wider) than stator 302, extending all the way to the internal surface 319 of the torque motor housing 315 and without the gap 303 between stator 302 and housing 305 seen in FIG. 3A. A thermally conductive gap filling material is used between the outer cover for housing 305 and the resolver mount for stator 312, to facilitate heat transfer to the external environment cold temperature airflow 314.

TABLE 1 below summarizes measured and calculated values from comparative analysis of armature temperature for the designs in FIGS. 2A-2B and 3A-3B, with armature conduction:

TABLE 1

| Design (FIG.) | Armature Temp. Rise (° C.) @260 W | Temp. Rise Coefficient (° C./W) | Comment |
| --- | --- | --- | --- |
| 3A | 314 | 1.20* | Adjusted heat transfer between armature and magnet to calibrate |
| 2A | 193 | 0.74 | Apply 3A calibration to 2A |
| 3B | | | Uses grease on hub and gap filling compound |
| 0.002 air gap | 97 | 0.37 | |
| 0.003 air gap | 108 | 0.41 | |
| 2B | | | Uses grease on hub and gap filling compound |
| 0.002 air gap | 55 | 0.21 | |
| 0.003 air gap | 60 | 0.23 | |

*From measurement

As apparent, at 260 Watts (W) of output power, the armature temperature increase for the design of FIG. 3B was only about one-third of the amount of the armature temperature increase for the design of FIG. 3A, for an air gap of 0.002-0.003 inches in the design of FIG. 3B. At the same output power, the armature temperature increase for the design of FIG. 2B was less than one-third of the armature temperature increase for the design of FIG. 2A for the same air gaps. Likewise, the temperature rise coefficient, in degrees Celsius per Watt (° C./W), is approximately one-third for the designs of FIGS. 2B and 3B versus the respectively counterpart designs of FIGS. 2A and 3A.

Figure 4:
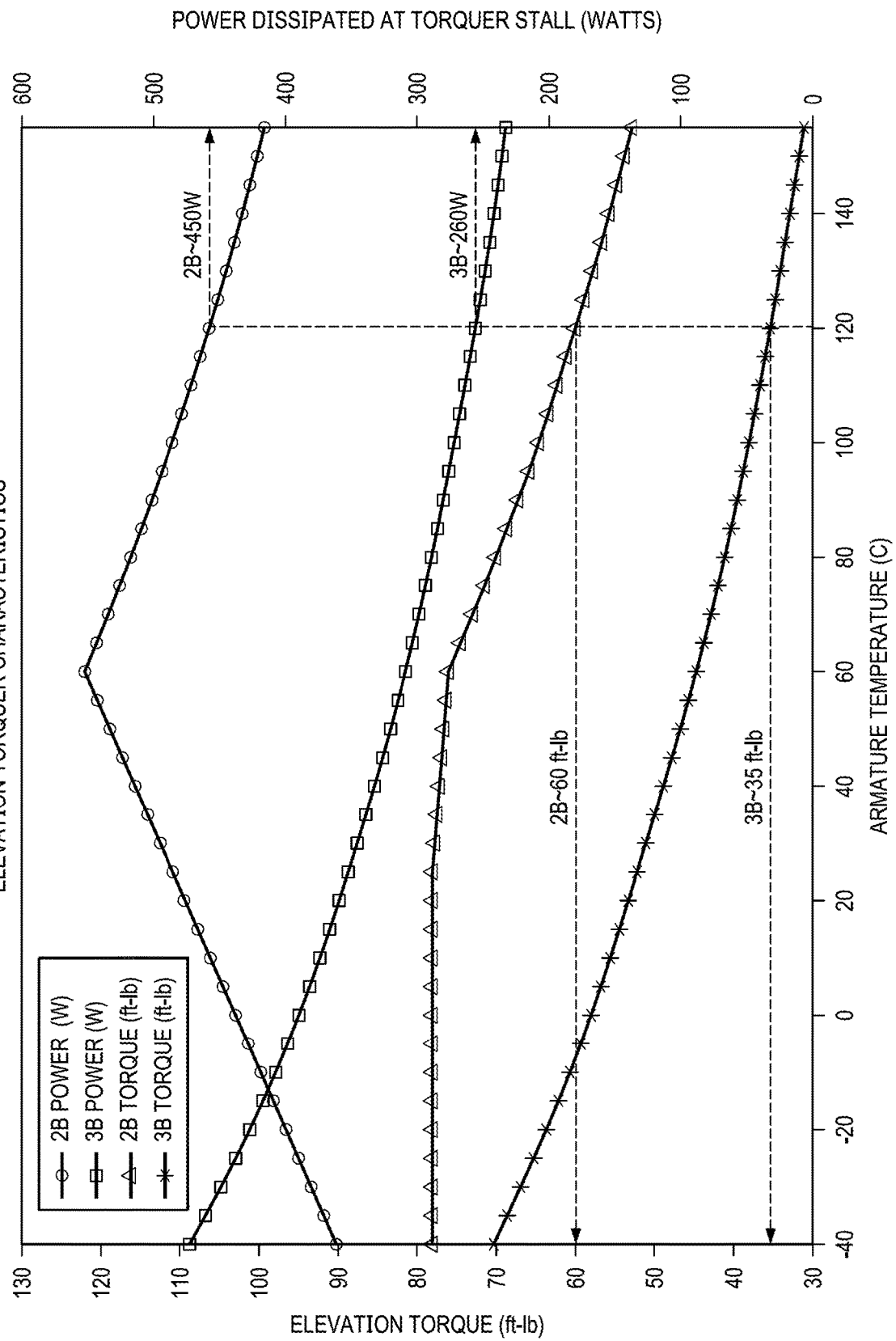
FIG. 4 is a plot of torque motor characteristics including elevation torque (ft·lb, left ordinate) and power dissipated at torque motor stall (W, right ordinate) as a function of armature temperature (° C., abscissa) for the designs in FIGS. 2B and 3B.

FIG. 4 is a plot of torque motor characteristics including elevation torque (ft·lb, left ordinate) and power dissipated at torque motor stall (W, right ordinate) as a function of armature temperature (° C., abscissa) for the designs in FIGS. 2B and 3B. This type of data may be used data to determine maximum operational airspeeds for a given torque motor design. For example, the superimposed lines indicate that the design of FIG. 2B could drive ~60 foot-pounds (ft·lb) of torque at an outside air temperature (OAT) of ~17° C., continuously, while the design of FIG. 3B could drive ~35 ft·lb of torque at an OAT of ~14° C., continuously.

Figure 5A:
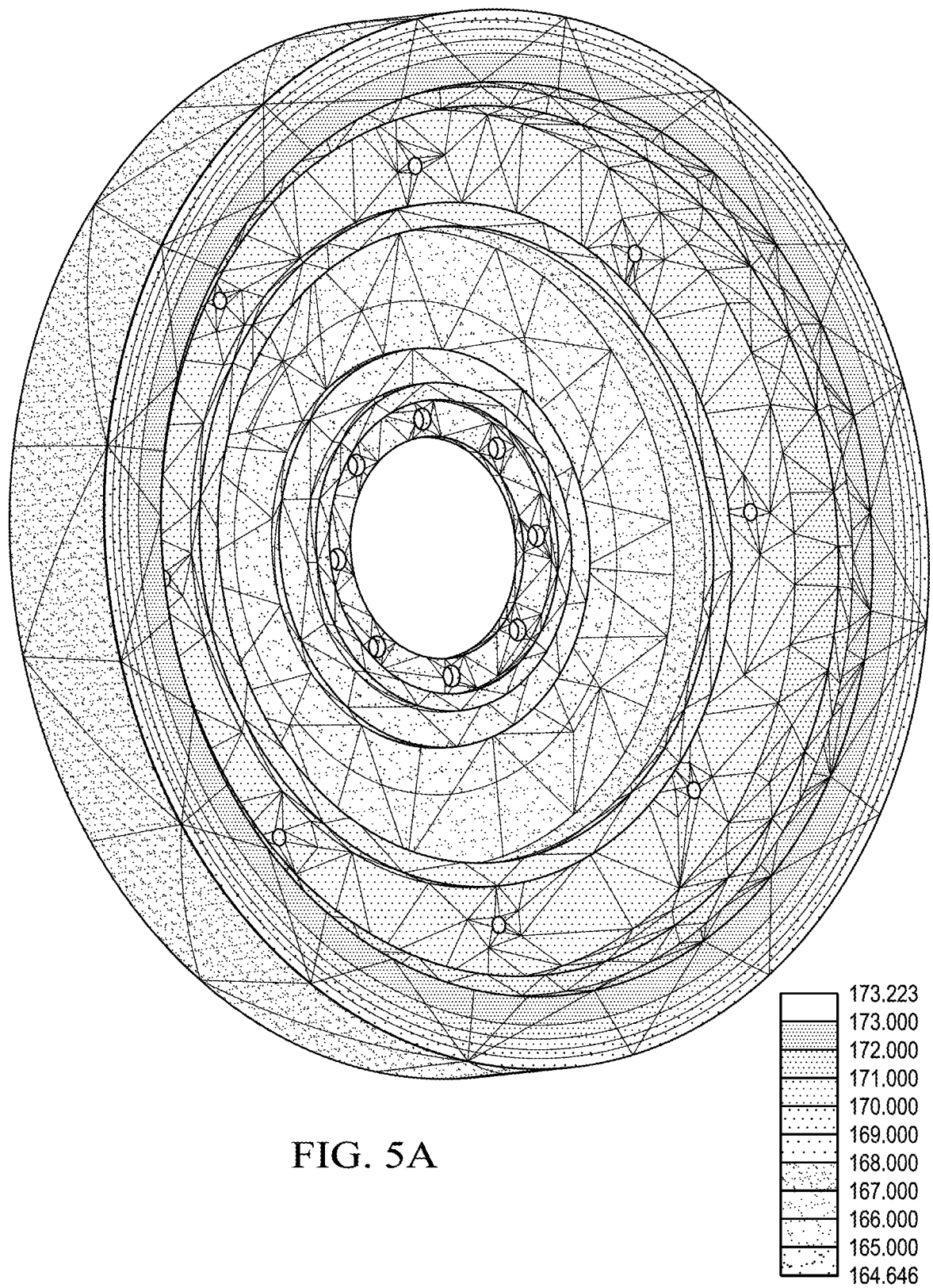
FIGS. 5A and 5B are comparative rotor temperature diagrams for the designs based on FIGS. 2A and 2B, respectively.
Figure 5B:
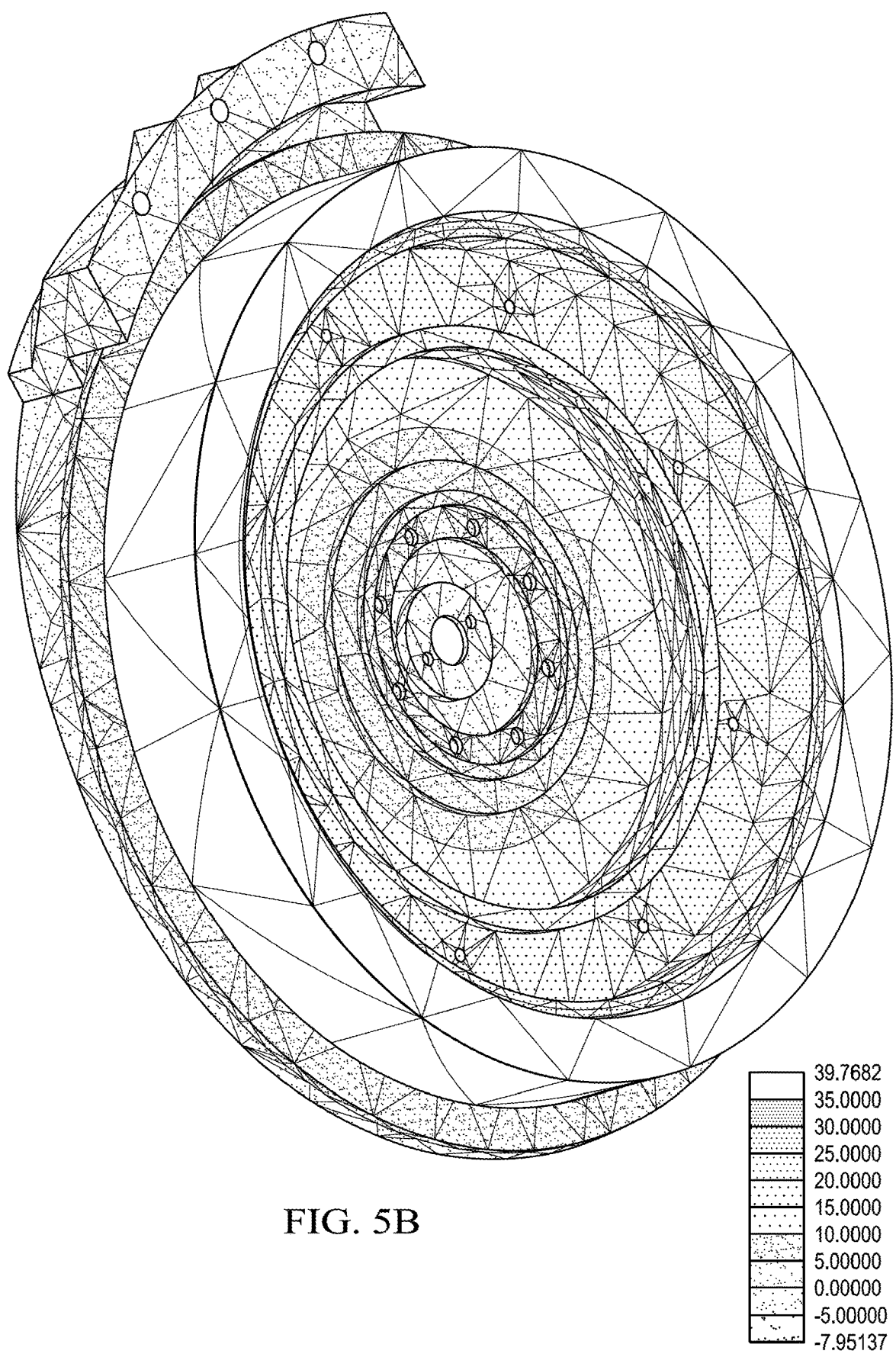

FIGS. 5A and 5B are comparative rotor temperature diagrams for the designs based on FIGS. 2A and 2B, respectively. FIG. 5A illustrates temperatures for the rotor of FIG. 2A with aluminum hubs having thermal resistances of 21700 Watts per square meter-degree Celsius (W/m$^{2.°}$ C.) on clamped faces and at an output power of 260 W and 75 W/m$^{2.°}$ C. (0.0145 inch airgap) with −20° C. ambient applied to area between magnet, deduced from lab measurements, and 4.65 W/m$^{2.°}$ C. with −20° C. ambient applied to all other surfaces (except area between magnet). FIG. 5B illustrates temperatures for a comparable rotor to that of FIG. 2A but with the spacing (close disk interface at 0.003 inch air gap, 362 W/m$^{2.°}$ C.) described for FIG. 2B, with aluminum hubs having thermal resistances of 393700 W/m$^{2.°}$ C. on the clamped faces and 9843 W/m$^{2.°}$ C. on the bore, and at an output power of 260 W and 75 W/m$^{2.°}$ C. (0.003 inch air gap) with −20° C. ambient applied to area between magnet, deduced from lab measurements, and 500 W/m$^{2.°}$ C. convection with a −20° C. boundary.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

By using a pair of large area disks on the rotor and stator separated by a small gap, a frictionless thermal coupling from the rotor to the stator is provided in a brushed torque motor. The stator may also be conductively coupled to the cold environment exterior of the torque motor using a thermally conductive liquid gap filling material, so that higher aerodynamic loads at faster aircraft speeds are counteracted by improved convection over exterior of system. Heat conduction between the rotor and stator will occur even when rotor is not rotating, allowing the design to be used solely to counter aerodynamic loads on torque motor with no turret motion. Retrofit of existing systems is quick and simple.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. A torque motor, comprising:
   a housing;
   a rotor;
   a stator surrounding at least a portion of the rotor, wherein the stator is conductively coupled to the housing by one of a thermal gap pad or a high conductivity thermal gap filling compound; and
   an air gap separating the rotor from the stator and allowing frictionless thermal coupling between the rotor and the stator,
   wherein the air gap has a dimension of about 0.002 inches to about 0.003 inches,
   wherein the torque motor is configured to transfer heat from the rotor to the stator by conduction, and
   wherein the stator is configured to contact an inner surface of the housing to conductively couple to a cold environment air flow exterior to the housing.

2. The torque motor according to claim 1, wherein the rotor provides a heat transfer area at least three times as large as a heat transfer area provided by a torquer within the torque motor.

3. The torque motor according to claim 1, wherein the torque motor is configured to transfer the heat from the rotor to the stator by conduction without rotation of the rotor.

4. The torque motor according to claim 1, wherein a surface area of the rotor is 100 times to 1,000,000 times greater than the dimension of the air gap squared.

5. The torque motor according to claim 1, wherein a surface area of the stator is larger than a surface area of the rotor.

6. The torque motor according to claim 1, further comprising one or more shims at an interface between the stator and an internal support structure for the stator to adjust a dimension of the air gap.

7. The torque motor according to claim 1, wherein an outermost surface area of the rotor is made as large as possible within spatial dimensions of the housing and other components required for the torque motor.

8. A method of forming a torque motor, the method comprising:
   providing a housing;
   providing a rotor;
   providing a stator surrounding at least a portion of the rotor, wherein the stator is conductively coupled to the housing by one of a thermal gap pad or a high conductivity thermal gap filling compound; and
   providing an air gap separating the rotor from the stator and allowing frictionless thermal coupling between the rotor and the stator,
   wherein the air gap has a dimension of about 0.002 inches to about 0.003 inches,
   wherein the torque motor is configured to transfer heat from the rotor to the stator by conduction, and
   wherein the stator is configured to contact an inner surface of the housing to conductively couple to a cold environment air flow exterior to the housing.

9. The method according to claim 8, wherein the rotor provides a heat transfer area at least three times as large as a heat transfer area provided by a torquer within the torque motor.

10. The method according to claim 8, wherein a surface area of the rotor is 100 times to 1,000,000 times greater than the dimension of the air gap squared.

11. The method according to claim 8, wherein a surface area of the stator is larger than a surface area of the rotor.

12. The method according to claim 8, wherein the torque motor is configured to transfer the heat from the rotor to the stator by conduction without rotation of the rotor.

13. The method according to claim 8, further comprising:
   providing one or more shims at an interface between the stator and an internal support structure for the stator to adjust a dimension of the air gap.

14. The method according to claim 8, wherein an outermost surface area of the rotor is made as large as possible within spatial dimensions of the housing and other components required for the torque motor.

15. A method of retrofitting a torque motor, the method comprising:
   providing a rotor having an outermost surface area that is as large as possible within spatial dimensions of a housing of the torque motor and other components required within the housing of the torque motor;
   providing a stator surrounding at least a portion of the rotor, wherein the stator is conductively coupled to the housing by one of a thermal gap pad or a high conductivity thermal gap filling compound; and
   providing an air gap separating the rotor from the stator and allowing frictionless thermal coupling between the rotor and the stator,
   wherein the air gap has a dimension of about 0.002 inches to about 0.003 inches,
   wherein the torque motor is configured to transfer heat from the rotor to the stator by conduction, and
   wherein the stator is configured to contact an inner surface of the housing of the torque motor to conductively couple to a cold environment air flow exterior to the housing of the torque motor.

16. The method according to claim 15, wherein a surface area of the stator is larger than a surface area of the rotor.

17. The method according to claim 15, wherein the rotor provides a heat transfer area at least three times as large as a heat transfer area provided by a torquer within the torque motor.

18. The method according to claim 15, wherein a surface area of the rotor is 100 times to 1,000,000 times greater than the dimension of the air gap squared.

19. The method according to claim 15, wherein the torque motor is configured to transfer the heat from the rotor to the stator by conduction without rotation of the rotor.

20. The method according to claim 15, wherein one or more shims at an interface between the stator and an internal support structure for the stator adjust a dimension of the air gap.

* * * * *